Jan. 11, 1927.　　　　　　　　　　　　　　　　　　1,613,749
C. G. GARRARD
CHANGE SPEED GEAR
Filed May 17, 1924　　　2 Sheets-Sheet 1

INVENTOR
Charles George Garrard
by Darby & Darby
his Attorneys

Jan. 11, 1927.　　　C. G. GARRARD　　　1,613,749
CHANGE SPEED GEAR
Filed May 17, 1924　　2 Sheets-Sheet 2
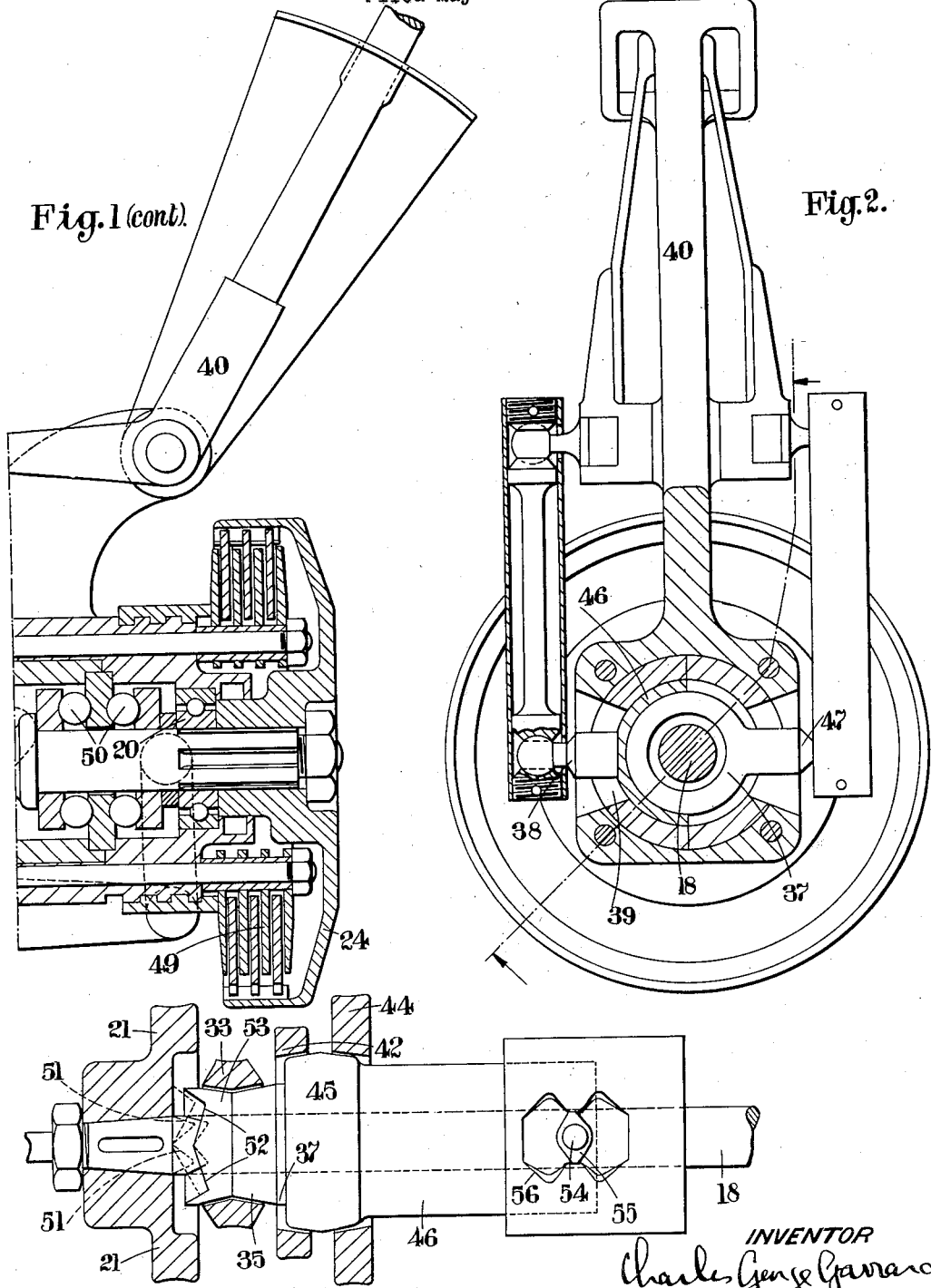

Patented Jan. 11, 1927.

1,613,749

UNITED STATES PATENT OFFICE.

CHARLES GEORGE GARRARD, OF LONDON, ENGLAND.

CHANGE-SPEED GEAR.

Application filed May 17, 1924, Serial No. 714,098, and in Great Britain May 17, 1923.

This invention relates to improvements in and relating to change speed gears and is particularly but not necessarily exclusively designed for use on automobiles.

In a gear previously invented by me the power is transmitted by a plurality of curved rollers, mounted in a cage to which the driven shaft is secured and engaging with and rotating between an inner and outer races with curved faces. The necessary binding pressure was provided by a longitudinal pressure applied to some or all of the rollers and/or races, and the parts were so shaped and the whole was so arranged that when the binding pressure necessary for power transmission had been applied to the parts, the angles made by the lines representing the normals to the surfaces in contact at the centres of the contact areas with a plane at right angles to the main axis of the gear, were as small as possible consistent with a contact area sufficient for power transmission, and in no case exceeded 10°. In this way the necessary longitudinal pressure was so resolved as to give a relatively high component of radial pressure with a correspondingly small radial movement, due to compression of the contact surfaces. Curved rollers and races the contact areas of which conform to these directions as to angularity are hereinafter referred to as "rollers and races of the type described" and a gear of the kind referred to above, the rollers and races of which conform to the directions given as to the angularity of their contact areas, is hereinafter referred to as a "gear of the type described." Such a gear is described in my copending case No. 657,552, filed August 15, 1923 and the present invention relates to improvements in gears of the type described whereby such gears are rendered suitable for use as change speed gears.

According to the invention the power is transmitted from the driving to the driven shaft by means of a plurality of rollers, spaced around, and with their axes parallel to the driven shaft. Each of these rollers is formed with a plurality of separate driving faces, of different diameters, and arranged side by side and concentrically on the same axis. Each of the roller faces contacts with and is adapted to rotate within and around one or more suitably shaped circular races, the rollers and races being of the type described and their diameters being so arranged and the parts being so disposed, that by selectively locking one or other of the races and leaving other races free, the driven shaft can be caused to rotate at one or other of a plurality of predetermined speeds in either direction. One face of each of the rollers is always rotating between two moving races, one of which is operatively connected to the driving, and the other to the driven shaft, and the various gears are obtained by locking one of the remaining race members either to the driven shaft, or to a stationary part. The device is so constructed and arranged that any desired gear can easily be picked up by means of any convenient gate or like change speed lever, or similar mechanism, without it being necessary to allow for the engagement of any toothed members, the use of which latter is entirely eliminated. The locking means are adapted to apply a lateral pressure to the rollers and races being utilized for driving.

Once the parts are in driving engagement, the binding pressure is always proportional to the power being transmitted, whereby slipping is prevented, and this binding pressure is created by the actional and reactional torque caused by the effort of the engine.

The invention also comprises various details of construction and assembly incidental to the satisfactory working of the device as above described.

A preferred form of construction according to the invention, is illustrated in the accompanying drawings, in which:—

Fig. 2 is a section on the line A—B of Fig. 1, and

Fig. 3 illustrates a modification of the device shown in Figs. 1 and 2.

Figure 1:
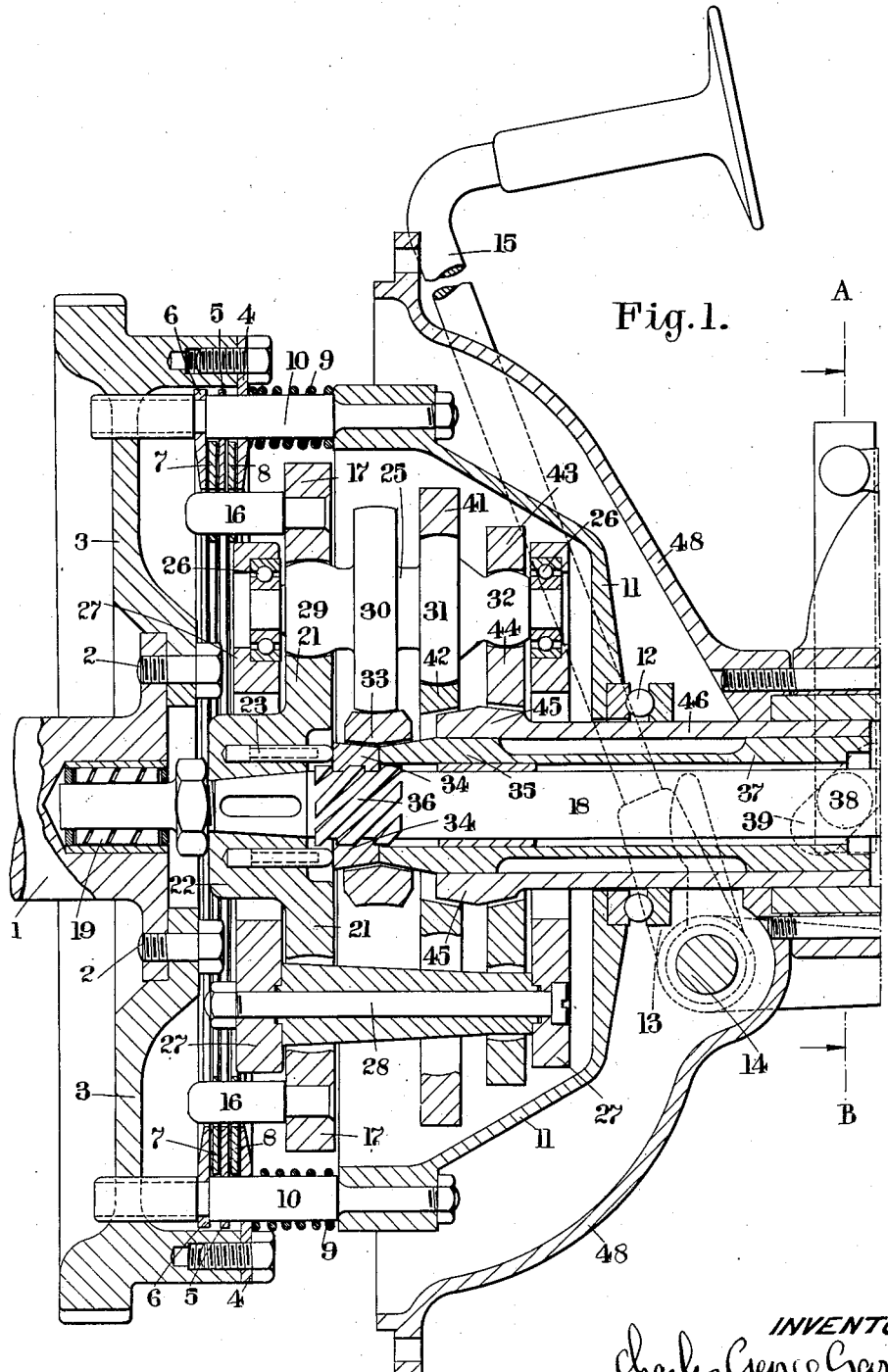
Fig. 1 shows a longitudinal sectional elevation of the device.

The crank shaft 1 of any internal combustion engine or other suitable prime mover, is centrally secured, by means of screws 2, or in any other convenient manner, to the fly-wheel 3. The fly-wheel 3 co-operates with any ordinary and suitable type of plate or like clutch. In the form illustrated in the drawings, the plates 4, 5 and 6 are constantly running or driving plates, whilst 7 and 8 are the driven plates. The plate 4 is permanently secured to the inner face of the fly-wheel, whilst plates 5 and 6 are mounted under the pressure of springs 9 on pins 10, which latter are bolted or otherwise secured to the clutch spider 11. This spider extends rearwardly, and is provided with a thrust ball-race 12, which serves also as an antifriction bearing for the forked lever 13 mounted on and fixed to the pedal shaft 14, which in turn is operated by the foot pedal 15. The plates 5 and 6 are thus movable laterally by means of the foot pedal 15, for the purpose of clutching and declutching, and when the plates 4, 5 and 6 are separated, the shaft 1 can revolve without any motion being transmitted to the gearing.

The driven plates 7 and 8, disposed between and alternating with the driving plates 4, 5 and 6, are slidably mounted on pins 16, to which is also secured the annular outer driving race 17, which preferably has a concave driving face. This race 17 is thus driven at engine speed when the clutch is in. The driven shaft 18 is centrally disposed within the gear, being carried at each end by the bearings 19 and 20, and at its end nearest to the fly-wheel, there is centrally secured the constant speed inner race 21, preferably having a concave face to form a circular track or path, within and around which rollers to be described, rotate. The race 21 is formed with a central boss 22, which accommodates the spring plungers 23. At the other end of the shaft 18, there is secured any convenient type of brake drum or the like 24, from which the power is transmitted in any suitable manner, preferably through a universal joint, not shown, to the wheels of the motor car.

Disposed around, and with their axes parallel to the shaft 18, there are a plurality of transmission rollers 25. These rollers are supported by the race 21, and they are mounted in ball bearings 26, arranged within a circular caging 27, assembled and bolted together by means of the bolts 28. These rollers 25 are spaced around the shaft 18 in a circular path, the cage 27 serving to keep them in their correct position, both as regards the spacing, and with their axes parallel to the shaft 18.

The rollers 25 are compound rollers, that is to say that each roller has a plurality of separate and different diameters, arranged parallel to each other, side by side, along the roller axis, and a separate outwardly curved driving face is provided at each diameter. The number of these diameters depends on the number of different gear ratios which it is desired to arrange in one and the same device. In the form illustrated in the drawings, four of such diameters are provided on each roller, namely 29, hereinafter called the constant speed diameter, 30, which is utilized for providing the third or top and second gears 31, which provides the lowest or first gear, and 32 which provides the reverse, these rollers of course co-operating with their several races, to be described, so as to effect their several purposes. The diameters 30 of the rollers 25 are arranged around, and with their faces contacting with the concave outer face of an inner race 33, disposed around, but not contacting with, the shaft 18. The race member 33 is formed with two inner oppositely directed conical faces, adapted to be engaged by one or other of the male cones 34 and 35 respectively, disposed around the shaft 18 and between it and the race 33. The cone 34 is freely mounted on a spiral thread 36, cut on the shaft 18, in such a manner that when it is free to engage it tightens itself in one direction only on the shaft. The spring plungers 23 abut against one face of the cone 34, tending to push it into engagement with the race 33, which however, is only possible when the oppositely disposed cone 35, formed at the end of the sleeve 37 surrounding the shaft 18 is withdrawn. When the cone 35 is moved forward, it first pushes cone 34 out of engagement with race member 33, and on further movement, it locks the race 33 to the sleeve 37 at the rear end of which is secured a peg or the like 38, adapted to be moved in a spiral or inclined slot member 39, secured to the casing or housing of the gear box. The peg 38 is in any convenient manner, connected to, and operated by, the change speed lever or the like 40 which may be arranged to operate in any suitable form of gate or like device, so arranged as to permit of only one gear ratio being in action at one and the same time.

The first gear diameters 31 contact with and rotate between the annular concave faced outer race 41 and the inner race 42, and the reversing diameters 32 are similarly disposed between the concave faced outer race 43 and the inner race 44. The outer race members 41 and 43 are provided merely to help to retain the necessary binding pressure between the parts. They do not transmit any power, and if desired, a similar race could be disposed around the diameters 30, or on the other hand, some of these races could be omitted, although the diameters at the two ends of the rollers should have outer races for the purpose described, and to retain the rollers in the proper positions. The inner races 42 and 44 are disposed around, but do not contact with the central shaft 18 and sleeve 37, and they have oppositely directed conical inner faces, each of which is adapted to be engaged and locked by one of the two oppositely directed and suitably arranged faces of the double cone member 45 disposed between the said races and the end of the sleeve 37. The cone member 45 forms the end of the outer sleeve 46, slidably disposed around the sleeve 37, and adapted to be moved in either direction, as required by the peg 38 moving in the groove 39, and connected to the lever 40. The races 42 and 44 and the cone 45 are so disposed and arranged that at will both the said races may be left free, or either one of them may be locked to the cone 45 and the other left free.

The relative diameters of the several races and rollers are so arranged that when the parts co-operate together in the manner to be described, they produce the several desired speeds in the forward and reverse directions.

It should be noted that the curved contact faces of the driving rollers as well as the curved faces of the races contacting therewith and the parts generally, are so arranged that the contacting surfaces of all rollers and races conform as to their angularity when driving with the directions given hereinbefore, and this applies to all modifications of the invention herein described.

The whole gearing and clutch are enclosed in the casing 48, which may either be fastened to, or made integral with the engine casing, or may be made as a separate unit entirely. The brake drum 24 and brake 49 may either be mounted upon the gear casing or not, as desired. Ball or like thrust bearings 50 are provided for taking the thrust of the shaft 18.

The operation of this form of the device is as follows.

When the clutch is in, the race 17 rotates at engine speed, and if now the cone 35 be assumed to be out of engagement with the inner race 33, the spring plungers 23 will force the cone 34 forward and into engagement with the conical centre of the race 33.

The cone 34, under the influence of the reactional torque of the roller diameters 30, will tighten itself on the thread 36, thereby locking the race 33 directly to the shaft 18. The cone member 45 being of course out of engagement with both of its co-operating members 42 and 44, the whole of the rollers and races will be locked relatively to each other, whilst a binding pressure, proportional to the power being transmitted, is put upon the points of contact of the roller diameters 29 and 30, and the races 17, 21 and 33. This prevents any slipping of the parts, and causes the shaft 18 to revolve at the same speed as that of the race 17, (i. e. engine speed), thus providing the normal or top gear without any reduction.

When the cone member 35 is moved forward, which is done by means of the change speed lever 40 and peg 38, it pushes the cone 34 out of engagement with race 33, and releases the whole of the rollers and races, allowing them to rotate freely at their respective speeds. On further movement, the cone 35 engages the other of the two inner faces of race 33, thereby again locking the latter by means of the reactional torque, which in this case however, acts on the slot 39 through the peg 38, integral with the sleeve 37. Race 33 being held whilst race 17 rotates, will cause the rollers to rotate about their own axes, thus causing the race 21, and with it the shaft 18, to rotate. Owing to the difference in diameters of the driving and the driven races respectively, the speed of the latter will be less than that of the former, its direction of rotation being the same. The speed reduction is a function of the relative diameters of the races 17 and 33, and may be arranged as desired. In the form illustrated in the drawings, this gives the second gear. The first gear is obtained when the race 33 is freed by proper adjustment of sleeve 37 and race 42 is locked by the cone 45, operated by the lever 40, peg 47 and sleeve 46. A similar rolling action again takes place, but the diameter of race 42 in relation to that of race 17 is such that a much greater reduction of speed takes place.

To obtain the reverse, the races 33 and 42 are freed, whilst race 44 is locked by means of the cone 45. Rolling action again takes place, but as the diameter of the rollers at 32 in contact with the locked race 44 is smaller than the diameters 29 engaging with the driven race 21, the latter will rotate in the opposite direction to that of the driving race 17, thus providing a reverse, and at the same time, a very low speed.

In each of the four positions described, the necessary binding pressure or lateral thrust is created by the actional or reactional torque caused by the engine when driving, this thrust being applied to those roller faces and races which are actually being used to transmit power. In the case of the top gear, the action and reaction take place through the members 21, 29, 30, 33, 34 and 18, and are proportional to the power being transmitted, whilst the loss of power is reduced to a minimum on the top gear, owing to the fact that no relative motion takes place between any of the gear members. In the case of the second gear, the corresponding cycle is through the members 21, 29, 30, 33, 35, 38, 39 and to the thrust bearing 50, whilst the remaining gears function similarly through their respective parts.

The pegs 38 and 47 serve the double purpose of operating their respective sleeves so as to put the selected gear ratio into operation, and also of putting the initial binding pressure necessary for power transmission, on to the respective parts. Once the parts have commenced to drive, the actional or reactional torque of the engine itself will provide the necessary lateral thrust, so as to produce the required pressure between the curved faces of the rollers and races.

It will be observed that in the device described above, and illustrated in Figs. 1 and 2, any desired gear can only be put into or taken out of action, when no power is being transmitted. In order therefore to effect a change of gear, it is either necessary to declutch, or else to throttle down the engine to such an extent as to cause the shaft 18 to over-run, when the lateral pressure on the member previously driving will be released, whilst utilizing the top gear, owing to the action of the spiral thread 36 and owing to the action of the pegs and inclined slots in the cases of the lower gears and the reverse, thus enabling the desired change to be made. This feature of the release of power when over-running takes place is useful to enable the car to run freely down hill, without the engine turning at an unnecessarily high speed, which tends to reduce both fuel consumption, and wear and tear.

Fig. 3 illustrates a modification of the device shown in Figs. 1 and 2, and this modification is intended for use in cases where the free-wheeling or over-running feature, described in the preceding paragraph is not desired. This method of construction enables power to be transmitted in either direction of rotation. In Fig. 3, 18 represents the central shaft, and the inner race members 21, 33, 42 and 44, perform the same or similar functions as the parts bearing the same reference numerals in Fig. 1, whilst the transmission rollers, clutch, and other parts of the device being also similarly arranged, are not shown in this figure. Around the centre of the inner race 21, there are formed a plurality of double angle cam faces 51, adapted to engage with a similar series of cam faces 52 formed on the outer face of the cone member 53, disposed around the central shaft 18. This cone member takes the place of the spirally mounted cone 34 in the device shown in Fig. 1 and serves to lock the race 33 to the race 21. The cam faces 51 and 52 are so shaped and arranged that when the race 33 tends to rotate relatively to the race 21, in either direction, a lateral movement and pressure are set up, thus providing the top or direct drive. The second, first and reverse gears are obtained by lateral movement of the cones 35 and 45 formed at the ends of the sleeves 37 and 46, by means of any convenient gate change lever or like selecting mechanism. These sleeves are operated by means of the pin 54, having a cam face 55, adapted to be driven against the inclined or spiral surfaces 56 of a stationary bush. When any of the conical clutch surfaces makes contact with its respective race, and the latter tends to rotate in either direction, the necessary lateral thrust will be set up owing to the engagement of the cam 55 with one or other of the surfaces 56, which are formed in both directions, i. e. right hand and left hand, thus providing for whatever direction of rotation is being used. Where this form of the invention is used, changes of gear are of course effected only when the clutch is out.

In the foregoing, the invention has been described as constructed with rollers having outwardly curved faces, contacting with inwardly curved races, but it will be obvious that where desired, the opposite arrangement, i. e. inwardly curved rollers contacting with outwardly curved race members, could also be employed.

In the foregoing description, and in the drawings, two different methods of carrying out the invention have been described and illustrated, but I desire to state that these are to be regarded as examples only, as many variations and changes in constructional details may be effected, without departing from the scope of the invention.

I claim:—

1. A change speed gear of the type described, comprising a driving member having a race thereon, a driven member having a race thereon, a plurality of rollers of different diameters mounted on a common axis for rotation interposed between said races, a plurality of races of different diameters, one for each of said rollers, and means for causing a lateral pressure to be applied to the particular rollers and races to be utilized for driving whereby any desired speed or reverse may be obtained.

2. A change speed gear of the type described, comprising a driving member having a race thereon, a driven member having a race thereon, a plurality of rollers of different diameters mounted on a common axis for rotation interposed between said races, a plurality of races arranged in sets, one for each roller, one face of each of said rollers rotating between each set of races, one of which is operatively connected to said driving member, and one to said driven member, and means for selectively locking one of said races to the driving member while leaving the others free.

3. A change speed gear of the type described, comprising a driving member having a race thereon, a driven member having a race thereon, a plurality of rollers of different diameters mounted on a common axis for rotation interposed between said races, a plurality of races arranged in sets, one for each roller, one face of each of said rollers rotating between each set of races, one of which is operatively connected to said driving member, and one to said driven member, and means for selectively locking one of said races to the driving member while leaving the other free, said locking means causing a lateral pressure to be applied to the particular rollers and races being utilized for driving at each particular speed.

4. The device of claim 2, in which the selectively lockable races are completely arranged around the driven shaft, clutch members for operatively locking said races to said driven shaft disposed between said races and said shaft, and a gate change lever mechanism for operating said clutch members.

5. The device of claim 2, including a driven shaft, spiral cam surfaces on said shaft, said locked race operating through said cam faces, whereby binding pressure on the parts is always proportional to the power being transmitted.

In witness whereof I have affixed my signature.

CHARLES GEORGE GARRARD.